(12) United States Patent
Wang et al.

(10) Patent No.: US 10,329,976 B2
(45) Date of Patent: Jun. 25, 2019

(54) NON-THERMAL PLASMA/OZONE-ASSISTED CATALYTIC SYSTEM AND USE IN EXHAUST SYSTEMS

(71) Applicant: GM Global Technology Operations LLC, Detroit, MI (US)

(72) Inventors: Lei Wang, Rochester Hills, MI (US); Gongshin Qi, Troy, MI (US); Wei Li, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 116 days.

(21) Appl. No.: 15/675,126

(22) Filed: Aug. 11, 2017

(65) Prior Publication Data

US 2019/0048770 A1 Feb. 14, 2019

(51) Int. Cl.
| | |
|---|---|
| *F01N 3/01* | (2006.01) |
| *H05H 1/24* | (2006.01) |
| *F01N 3/027* | (2006.01) |
| *F02M 26/22* | (2016.01) |
| *B01D 53/32* | (2006.01) |
| *B01D 53/94* | (2006.01) |

(Continued)

(52) U.S. Cl.
CPC ............ *F01N 3/01* (2013.01); *F01N 3/0275* (2013.01); *F02M 26/22* (2016.02); *B01D 53/32* (2013.01); *B01D 53/9445* (2013.01); *B01D 53/9459* (2013.01); *B01J 19/088* (2013.01); *B01J 2219/0896* (2013.01); *F01N 2240/28* (2013.01); *F01N 2240/38* (2013.01); *F01N 2900/0416* (2013.01); *F01N 2900/1402* (2013.01); *F01N 2900/1404* (2013.01); *F01N 2900/1621* (2013.01); *H05H 1/24* (2013.01); *H05H 2001/481* (2013.01)

(58) Field of Classification Search
CPC .......... F01N 3/01; F01N 3/0275; F01N 3/103; F01N 2240/28; F01N 2240/38; F01N 2900/0416; F02M 26/22; H05H 1/24
See application file for complete search history.

(56) References Cited

U.S. PATENT DOCUMENTS

| | | | |
|---|---|---|---|
| 6,716,398 B2 | 4/2004 | Caren et al. | |
| 2009/0158715 A1* | 6/2009 | Stroh | F01N 3/0814 60/295 |

(Continued)

FOREIGN PATENT DOCUMENTS

JP 2012241524 A * 12/2012

*Primary Examiner* — Audrey K Bradley
(74) *Attorney, Agent, or Firm* — Quinn IP Law

(57) ABSTRACT

An engine assembly includes a diesel internal combustion engine and an aftertreatment system coupled to the diesel internal combustion engine. The aftertreatment system includes a diesel oxidation catalyst coupled to the diesel internal combustion engine such that the diesel oxidation catalyst receives exhaust gases from the diesel internal combustion engine. The aftertreatment system includes a plasma generator in fluid communication with the diesel oxidation catalyst, wherein the plasma generator is upstream of the diesel oxidation catalyst and downstream of the diesel internal combustion engine, and the plasma generator is configured to generate oxidizers to at least partially oxidize hydrocarbons in the exhaust gases exiting the diesel internal combustion engine.

12 Claims, 8 Drawing Sheets

(51) Int. Cl.
*B01J 19/08* (2006.01)
*H05H 1/48* (2006.01)

(56) References Cited

U.S. PATENT DOCUMENTS

2009/0241775 A1* 10/2009 Ogut .................. F01N 3/38
 95/59
2017/0335731 A1* 11/2017 Schickler ............ F02M 26/14

* cited by examiner

NON-THERMAL PLASMA/OZONE-ASSISTED CATALYTIC SYSTEM AND USE IN EXHAUST SYSTEMS

INTRODUCTION

The present disclosure relates to a non-thermal plasma/ozone-assisted catalytic system for gas and diesel applications.

SUMMARY

The present disclosure relates to an engine assembly capable of applying plasma or ozone to enhance emission control efficiency. By using this engine assembly, hydrocarbons can be partially oxidized by the non-thermal plasma before reaching the diesel oxidation catalyst (DOC) or three-way catalyst (TWC), and the partially oxidized hydrocarbons can be oxidized or stored at a minimal temperature. The NO can be oxidized to $NO_2$ by the plasma or ozone, and the formed $NO_2$ can enhance hydrocarbon oxidation performance. The present disclosure also relates to a method that achieves the optimal ozone ($O_3$) concentration to regenerate an exhaust gas recirculation (EGR) cooler. In this method, catalysts are deposited on the EGR cooler wall to facilitate soot oxidation reaction, thereby enhancing the EGR cooler efficiency. The present disclosure also relates to a method that achieves optimal exhaust chemistry to leverage plasma-based NO to $NO_2$ conversion to passively regenerate sensors covered by soot in the exhaust system.

In some embodiments, the engine assembly includes a diesel or gasoline internal combustion engine and an aftertreatment system coupled to the diesel or gasoline internal combustion engine. The aftertreatment system includes a diesel oxidation catalyst coupled to the diesel internal combustion engine such that the diesel oxidation catalyst receives exhaust gases from the diesel internal combustion engine. The aftertreatment system includes a plasma generator in fluid communication with the diesel oxidation catalyst, wherein the plasma generator is upstream of the diesel oxidation catalyst and downstream of the diesel internal combustion engine, and the plasma generator is configured to generate oxidizers to at least partially oxidize hydrocarbons in the exhaust gases exiting the diesel internal combustion engine. The engine assembly further includes a turbocharger in fluid communication with the aftertreatment system, wherein the turbocharger is in fluid communication with the plasma generator. The turbocharger defines an ambient air inlet and an exhaust gas outlet, and the plasma generator is closer to the exhaust gas outlet than to the ambient air inlet. The engine assembly further includes an exhaust gas recirculation (EGR) cooler in fluid communication with the diesel internal combustion engine. The plasma generator is in fluid communication with the EGR cooler, wherein the plasma generator is configured to supply oxidizers to the EGR cooler to facilitate a soot oxidation reaction in the EGR cooler. The engine assembly further includes a controller coupled to the plasma generator to allow the controller to control the plasma generator, wherein the controller is programmed to turn on the plasma generator. The controller is programmed to determine that an efficiency of the EGR cooler is greater than a minimum efficiency threshold, and the controller is programmed to turn off the plasma generator in response to determining that the efficiency of the EGR cooler is greater than the minimum efficiency threshold. The controller is programmed to determine that a temperature of the exhaust gases flowing out the EGR cooler falls within a predetermined EGR temperature range. The controller is programmed to turn off the plasma generator in response to determining that the temperature the exhaust gases flowing out of the EGR cooler falls within the predetermined EGR temperature range. The controller is programmed to determine that an ozone concentration of the exhaust gases flowing out of the EGR cooler is greater than a maximum ozone-concentration threshold. The controller is programmed to turn off the plasma generator in response to determining that the ozone concentration of the exhaust gases flowing out of the EGR cooler is greater than the maximum ozone-concentration threshold. The aftertreatment system includes a main conduit and an aftertreatment oxygen sensor (or NOx sensor) coupled to the main conduit such that the aftertreatment oxygen sensor is configured to determine an oxygen (or NOx) concentration in the exhaust gases flowing through the main conduit, and the aftertreatment oxygen sensor (or NOx sensor) is configured to generate a signal indicative of the oxygen (or NOx) concentration in the exhaust gases flowing through the main conduit. The engine assembly further includes a controller coupled to the plasma generator to allow the controller to control the plasma generator. The controller is programmed to turn on the plasma/ozone generator. The controller is in communication with the aftertreatment oxygen sensor. The controller is configured to determine that the aftertreatment oxygen sensor is operational, and the controller is configured to turn off the plasma/ozone generator in response to determining that the aftertreatment oxygen sensor is operational. The controller is configured to determine that a temperature of the aftertreatment oxygen sensor falls outside a predetermined sensor-temperature range. The controller is programmed to turn off the plasma generator in response to determining that the temperature of the aftertreatment oxygen sensor falls outside the predetermined sensor-temperature range.

The controller is configured to determine that the oxygen concentration of the exhaust gases flowing through the main conduit is greater than an oxygen-concentration threshold, and the controller is programmed to turn off the plasma generator in response to determining that the oxygen concentration of the exhaust gases flowing through the main conduit is greater than the oxygen-concentration threshold. The engine assembly further includes a turbocharger in fluid communication with the aftertreatment system, wherein the plasma generator is in fluid communication with the turbocharger, the engine assembly further includes an exhaust gas recirculation (EGR) cooler in fluid communication with the diesel internal combustion engine. The plasma generator is in fluid communication with the EGR cooler. The plasma generator is configured to supply the oxidizers to the EGR cooler to facilitate a soot oxidation reaction in the EGR cooler. The turbocharger defines a turbocharger inlet and a turbocharger outlet, and the plasma generator is closer to the turbocharger outlet than to the turbocharger inlet. The engine assembly includes a controller coupled to the plasma generator to allow the controller to control the plasma generator. The controller is programmed to turn on the plasma generator, the controller is programmed to determine that a temperature of the exhaust gases flowing into the EGR cooler is greater than a maximum EGR-temperature threshold. The controller is programmed to turn off the plasma generator in response to determining that the temperature of the temperature of the exhaust gases flowing into the EGR cooler is greater than the maximum EGR-temperature threshold. The controller is programmed to determine that an ozone concentration of the exhaust gases flowing into the EGR cooler is greater than a maximum ozone-concentration threshold. The controller is programmed to turn off the plasma generator in response to determining that the ozone concentration of the exhaust gases flowing into the EGR cooler is greater than the maximum ozone-concentration threshold. The aftertreatment system includes a main conduit and an oxygen sensor coupled to the main conduit such that the oxygen sensor is configured to determine an oxygen concentration in the exhaust gases flowing through the main conduit. The oxygen sensor is configured to generate a signal indicative of the oxygen concentration in the exhaust gases flowing through the main conduit. The controller is coupled to the oxygen sensor such that the controller is configured to receive the signal from the oxygen sensor. The controller is configured to determine that the oxygen sensor is operational. The controller is configured to turn off the plasma generator in response to determining that the oxygen sensor is operational. The engine assembly includes an intake manifold in fluid communication with the diesel internal combustion engine. The intake manifold is in fluid communication with the turbocharger. The EGR cooler is in fluid communication with the intake manifold. The controller is configured to determine that a temperature of the oxygen sensor is greater than the minimum sensor-temperature threshold. The controller is configured to determine that the temperature of the oxygen sensor is less than a maximum sensor-temperature threshold. The controller is programmed to turn off the plasma generator in response to determining that the temperature of the oxygen sensor is greater than the minimum sensor-temperature threshold and that the temperature of the oxygen sensor is less than the maximum sensor-temperature threshold. The engine assembly includes a condenser-radiator-fan module (CRFM) in fluid communication with the EGR cooler, the CRFM is configured to supply coolant to the EGR cooler. The aftertreatment system includes a selective catalytic reduction (SCR) unit coupled to the main conduit, the SCR unit is downstream of the plasma generator. The aftertreatment system includes a diesel exhaust fluid (DEF) injector coupled to the main conduit. The DEF injector is downstream of the plasma generator to inject DEF into the main conduit downstream of the plasma generator. The controller is configured to determine that the oxygen concentration of the exhaust gases flowing through the main conduit is greater than an oxygen-concentration threshold. The controller is programmed to turn off the plasma generator in response to determining that the oxygen concentration of the exhaust gases flowing through the main conduit is greater than the oxygen-concentration threshold.

The present disclosure also describes a vehicle including a diesel internal combustion engine and an aftertreatment system coupled to the diesel internal combustion engine. The aftertreatment system includes a main conduit coupled to the diesel internal combustion engine. The main conduit is configured to receive exhaust gases from the diesel internal combustion engine. The aftertreatment system further includes a diesel oxidation catalyst coupled to the main conduit and a plasma generator in fluid communication with the main conduit. The plasma generator is upstream of the diesel oxidation catalyst and downstream of the diesel internal combustion engine. The plasma generator is configured to generate oxidizers to at least partially oxidize hydrocarbons in the exhaust gases exiting the diesel internal combustion engine. The vehicle further includes a turbocharger in fluid communication with the aftertreatment system, wherein the turbocharger is in fluid communication with the plasma generator. The turbocharger defines a turbocharger inlet and a turbocharger outlet, and the plasma generator is closer to the turbocharger outlet than to the turbocharger inlet. The vehicle further includes an exhaust gas recirculation (EGR) cooler in fluid communication with the diesel internal combustion engine. The plasma generator is in fluid communication with the EGR cooler. The plasma generator is configured to supply the oxidizers to the EGR cooler to facilitate a soot oxidation reaction in the EGR cooler. The vehicle further includes a controller coupled to the plasma generator to allow the controller to control the plasma generator. The controller is programmed to turn on the plasma generator. The controller is programmed to determine that an efficiency of the EGR cooler is greater than a minimum efficiency threshold. The controller is programmed to turn off the plasma generator in response to determining that the efficiency of the EGR cooler is greater than the minimum efficiency threshold. The controller is programmed to determine that a temperature of the exhaust gases flowing into the EGR cooler is greater than a maximum EGR-temperature threshold. The controller is programmed to turn off the plasma generator in response to determining that the temperature of the temperature of the exhaust gases flowing into the EGR cooler is greater than the maximum EGR-temperature threshold.

The above features and advantages and other features and advantages of the present disclosure are readily apparent from the following detailed description of the best modes for carrying out the disclosure when taken in connection with the accompanying drawings.

DETAILED DESCRIPTION

Figure 1:
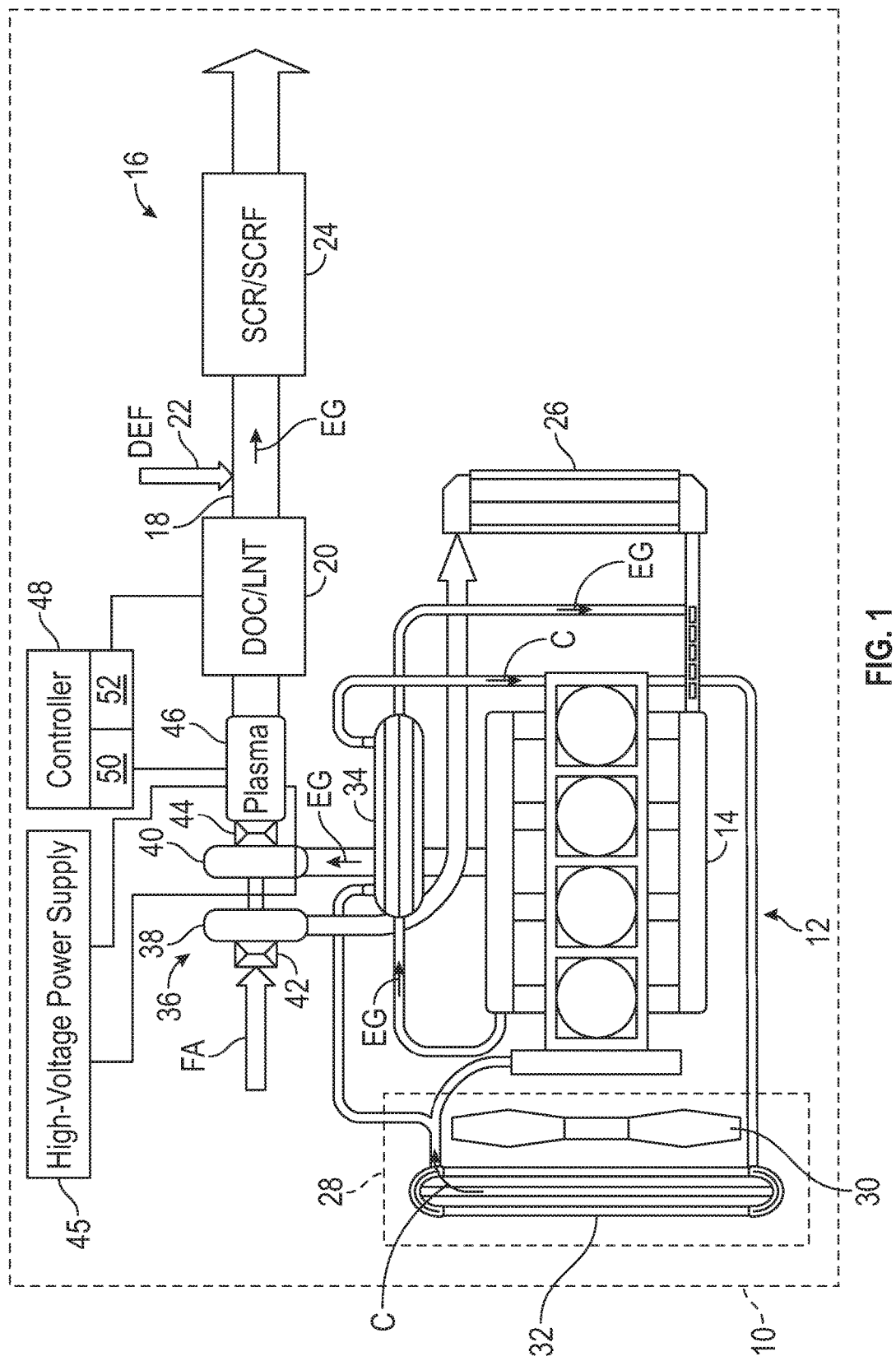
FIG. 1 is a schematic diagram of a vehicle including an aftertreatment system with a plasma generator.

With reference to FIG. 1, a vehicle 10 includes an engine assembly 12 for propulsion. The vehicle 10 may be a car a truck or any other suitable apparatus capable of transporting passenger and/or objects. The engine assembly 12 includes a diesel internal combustion engine 14 and an aftertreatment system 16 coupled to the diesel internal combustion engine 14. In particular, the aftertreatment system 16 is in fluid communication with the diesel internal combustion engine 14. As such, the aftertreatment system 16 is configured to receive and treat the exhaust gases (EG) generated by the diesel internal combustion engine 14. The aftertreatment system 16 includes a main conduit 18 and a diesel oxidation catalyst (DOC) 20 coupled to the main conduit 18. The DOC 20 is coupled to the diesel internal combustion engine 14. As such, the DOC 20 can receive exhaust gases (EG). from the diesel internal combustion engine 14. The DOC 20 is a device configured to convert carbon monoxide (CO) and hydrocarbons into carbon dioxide ($CO_2$) and water. The DOC 20 may be part of an assembly that also includes a lean NOx trap (LNT) configured to reduce oxides of nitrogen (NO and $NO_2$) emission from a lean burn internal combustion engine by means of adsorption. The aftertreatment system 16 also includes a diesel exhaust fluid (DEF) injector 22 coupled to the main conduit 18. The DEF injector 22 is configured to inject DEF into the main conduit 18 downstream of the DOC 20. The DEF is an aqueous urea solution used as a consumable in selective catalytic reduction (SCR) to lower NOx concentration in the exhaust gases EG. The aftertreatment system 16 includes a selective catalytic reduction (SCR) unit 24 coupled to the main conduit 18. Specifically, the SCR unit 24 is configured, with the aid of the DEF, to convert nitrogen oxides into nitrogen, water, and carbon dioxide. The SCR unit 24 may be also include a soot filter, and such units are referred to as a SCR on-filter or SCRF.

The engine assembly 12 further includes an intake manifold 26 configured to receive ambient air FA. The intake manifold 25 is in fluid communication with the diesel internal combustion engine 14 to provide ambient air FA to the diesel internal combustion engine 14. The engine assembly 12 further includes a condenser-radiator-fan module (CRFM) 28 including a fan 30 and a radiator 32. Coolant C flows through the radiator 32. The engine assembly 12 further includes an exhaust gas recirculation (EGR) cooler 34 in fluid communication with the radiator 32. Thus, the radiator 32 can supply coolant C to the EGR cooler 34. The EGR cooler 34 is also in fluid communication with the diesel internal combustion engine 14. As such, the EGR cooler 34 is configured to receive exhaust gases EG from the diesel internal combustion engine 14. The coolant C flowing through the EGR cooler 34 cools the exhaust gases EG flowing into the EGR cooler 34. Then, once cooled, the exhaust gases (EG) are injected, for example into the intake manifold 26, but upstream of the diesel internal combustion engine 14 to enhance the performance of the diesel internal combustion engine 14. The coolant C can exit the EGR cooler 34 and flow back to the radiator 32. The fan 30 can help cool the coolant C flowing through the radiator 32.

The engine assembly 12 further includes a turbocharger 36 for enhancing the performance of the engine assembly 12. The turbocharger 36 includes a compressor 38 and a turbine 40. The turbine 40 is mechanically coupled to the compressor 38. The turbocharger 36 has an ambient air inlet 42 configured to receive ambient air FA, and an exhaust gas outlet 44 configured to expel exhaust gas (EG). Specifically, the compressor 38 includes the ambient air inlet 42, and the turbine 40 includes the exhaust gas outlet 44. The turbocharger 36 is also in fluid communication with the intake manifold 26. As such, the ambient air FA may flow from the turbocharger 36 (specifically the compressor 38) to the intake manifold 26. The turbocharger 36 is also in fluid communication with the diesel internal combustion engine 14. Therefore, exhaust gases EG can flow from the diesel internal combustion engine 14 to the turbocharger 36 (specifically the turbine 40).

The engine assembly 12 further includes a plasma generator 46 in fluid communication with the DOC 20. A high-voltage power supply 45 is electrically connected to the plasma generator 46 to provide electricity to the plasma generator 46. The plasma generator 46 is in a close-couple/turbo out location. In this embodiment, the plasma generator 46 is upstream of the DOC 20 and downstream of the diesel internal combustion engine 14. The plasma generator 46 is configured to generate hydroxyl and associated radicals and oxidizers, such as ozone ($O_3$), (i.e., non-thermal plasma) to at least partially oxidize hydrocarbons in the exhaust gases EG exiting the diesel internal combustion engine 14. Therefore, the plasma generator 46 may be referred to as a hydroxyl generator. The plasma generator 46 may also be referred to as a non-thermal or cold plasma generator 46. Further, the plasma generator 46 may be an ozone generator configured to generate ozone. The turbocharger 36 is in fluid communication with the plasma generator 46. In the depicted embodiment, plasma generator 46 is closer to the turbocharger exhaust gas outlet 44 than to the ambient air inlet 42. For example, the plasma generator 46 may be closer to the turbocharger 36 than to the DOC 20 to ensure that that the hydrocarbons in the exhaust gases are oxidized before reaching the DOC 20. It is envisioned that the plasma generator 46 may have other locations (e.g., inside the DOC 20, closer to the DOC 20 than to the turbocharger, in a side stream of the aftertreatment system 16, some other place in the main conduit 18, upstream of the turbocharger 36). In the depicted embodiment, the plasma generator 46 is directly connected to the main conduit 18 of the aftertreatment system 16 to maximize the flow of the oxidizers into the aftertreatment system 16. In hybrid vehicles, the abundance of on-board electricity provides an ideal environment for integrating the plasma generator 46. The plasma generator 46 can be used during cold starts to enhance the efficiency of the aftertreatment system 16. Supplying non-thermal plasma (i.e., hydroxyl and associated radicals and oxidizers, such as ozone) to the exhaust gases (EG) exiting from the diesel internal combustion engine 14 before the exhaust gases (EG) reach the DOC 20 causes the hydrocarbons in the exhaust gases (EG) to partially oxide. The partially oxidize hydrocarbons can be further oxidized or stored at a low temperature, mainly forming aldehydes. The nitrogen oxides can be oxidized by the non-thermal plasma (i.e., hydroxyl and associated radicals and oxidizers, such as ozone) or zone at low temperatures, and the formed $NO_2$ can improve hydrocarbon oxidation performance. With the assistance of the non-thermal plasma supplied by the plasma generator 46, more than seventy percent of the NO is converted into $NO_2$ at 100 degrees Celsius. As a result, the presently disclosed aftertreatment system 16 maximizes NO oxidation efficiency and minimizes the formation of acid products. Further, the oxidation of $SO_2$ to $SO_3$ is suppressed with the presence of HCs. As discussed above, the hydrocarbons can be partially oxidized, and NO can be oxidized to $NO_2$ through the gas phase reaction. Partially oxidized could potentially be much easier to oxidized into $CO_2/H_2O$ in the presence of $NO_2$ on the catalyst, thereby resulting in lower HC/CO lightoff temperature (i.e., 100 to 500 degrees Celsius). The HC/CO lightoff temperature could be significantly decreased with the presence of ozone. Further, partially oxidized HCs could be much easier to be adsorbed on the DOC 20 at low temperatures (i.e., below 100 degrees Celsius). Supplying non-thermal plasma to the exhaust gases (EG) can also maximize fuel economy.

The engine assembly 12 further includes a controller 48 coupled to the plasma generator 46. As such, the controller 48 can control the operation of the plasma generator 46. For instance, the controller 48 can turn on or off the plasma generator 46. The controller 48 includes a processor 50, such as a microprocessor, and a memory 52, such as a non-transitory memory, in communication with the processor 50. The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of an event. Communications between controllers and between controllers, actuators and/or sensors may be accomplished using a direct wired link, a networked communications bus link, a wireless link or any another suitable communications link. The term 'model' refers to a processor-based or processor-executable code and associated calibration that simulates a physical existence of a device or a physical process.

Figure 2:
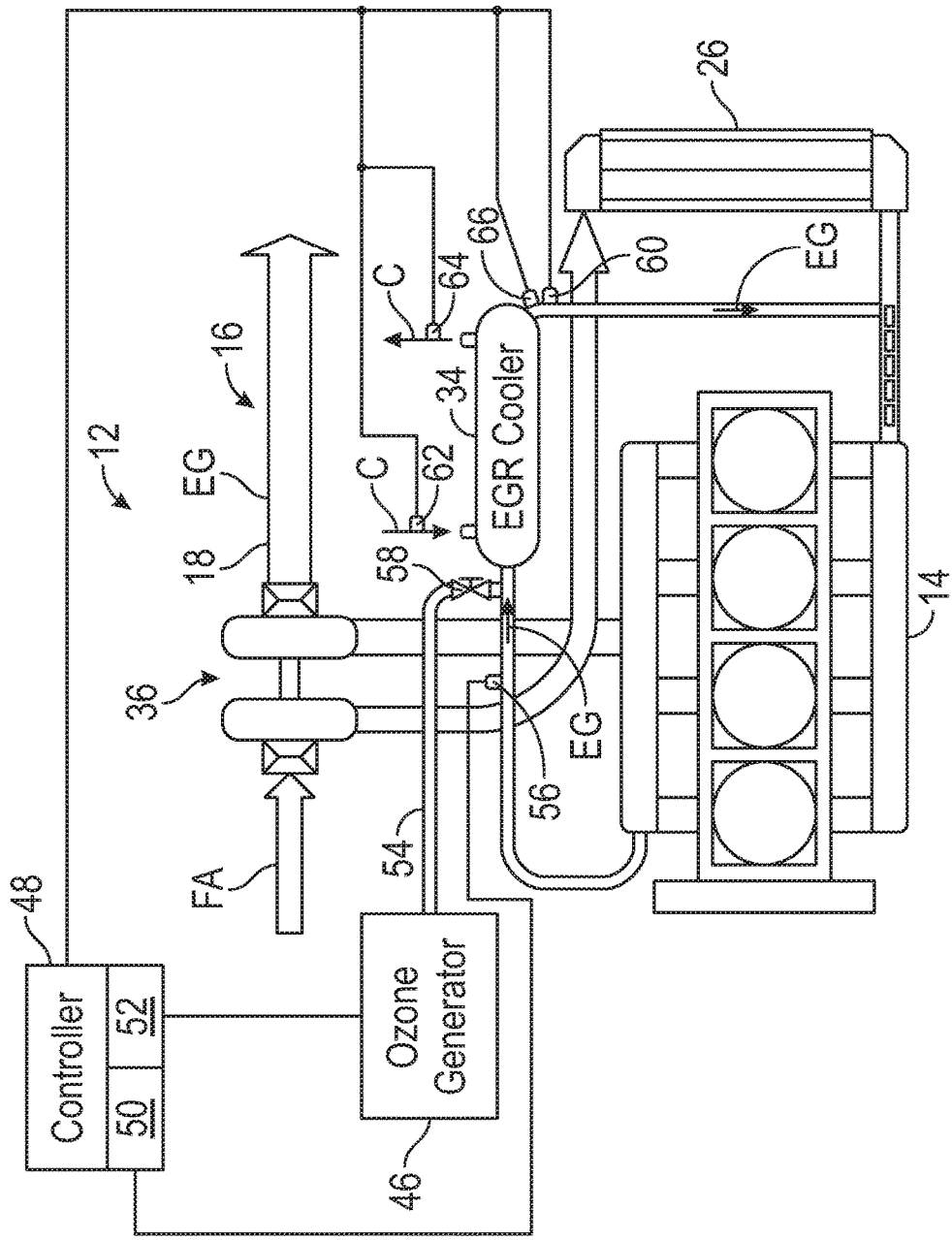
FIG. 2 is a schematic diagram of an engine assembly including an EGR cooler and a plasma generator in fluid communication with the EGR cooler.

With reference to FIG. 2, the plasma generator 46 may additionally or alternatively be in fluid communication with the EGR cooler 43. Thus, the embodiment shown in FIG. 2 may be combined with the embodiment shown in FIG. 1. Accordingly, the plasma generator 46 shown in FIG. 2 may be in fluid communication with the EGR cooler 34 in addition to being in direct fluid communication with the main conduit 18 of the aftertreatment system 16. The plasma generator 46 is configured to supply the oxidizers, such as ozone, to the EGR cooler 34 to facilitate a soot oxidation reaction in the EGR cooler 34. The engine assembly 12 may further include an oxidizer supply line 54 directly interconnecting the plasma generator 46 and the EGR cooler 34. In addition, a valve 58 may be disposed along the oxidizer supply line 54 to control the flow of plasma into the EGR cooler 34. The controller 48 may be coupled to the valve 58 to control the flowrate of non-thermal plasma flowing into the EGR cooler 34. Accordingly, the flowrate of the non-thermal plasma flowing into the EGR cooler 34 can be optimized. In the depicted embodiment, the plasma generator 46 is located upstream of the turbocharger 36 in the high-pressure loop of the EGR cooler 34. However, as discussed above, the embodiment shown in FIG. 2 may be combined with the embodiment shown in FIG. 1. Therefore, the plasma generator 46 may be coupled to the main conduit 18 of the aftertreatment system 16 (as shown in FIG. 1) and may still be in fluid communication with the EGR cooler 34 (as shown in FIG. 2). Alternatively, the engine assembly 12 may include two plasma generators 46, namely: one plasma generator 46 in direct fluid communication with the main conduit 18; and another plasma generator 46 in direct fluid communication with the EGR cooler 34.

The engine assembly 12 may include an EGR inlet-temperature sensor 56 may be disposed upstream of the EGR cooler 34 and downstream of the diesel internal combustion engine 14 to measure the temperature of the exhaust gases EG flowing into the EGR cooler 34. Further, the engine assembly 12 may include an EGR outlet-temperature sensor 60 to measure the temperature of the exhaust gases (EG) exiting the EGR cooler 34. Accordingly, the EGR outlet-temperature sensor 60 is downstream of the EGR cooler 34 and upstream of the diesel internal combustion engine 14. The engine assembly 12 further includes a coolant-inlet temperature sensor 62 to measure the temperature of the coolant C flowing into the EGR cooler 34. In addition, the engine assembly 12 includes a coolant-outlet temperature sensor 64 to measure the temperature of the coolant flowing out of the EGR cooler 34. The controller 48 is in communication with the EGR inlet-temperature sensor 56, EGR outlet-temperature sensor 60, the coolant-inlet temperature sensor 62, and the coolant-outlet temperature sensor 64. The controller 48 can determine the efficiency of the EGR cooler 34 based on the input signals received from the EGR inlet-temperature sensor 56, EGR outlet-temperature sensor 60, the coolant-inlet temperature sensor 62, and the coolant-outlet temperature sensor 64. The engine assembly 12 further includes an EGR oxygen sensor 66 coupled downstream of the EGR cooler 34 and upstream of the diesel internal combustion engine 14 to measure an ozone concentration of the exhaust gases EG flowing out of the EGR cooler 34.

Figure 3:
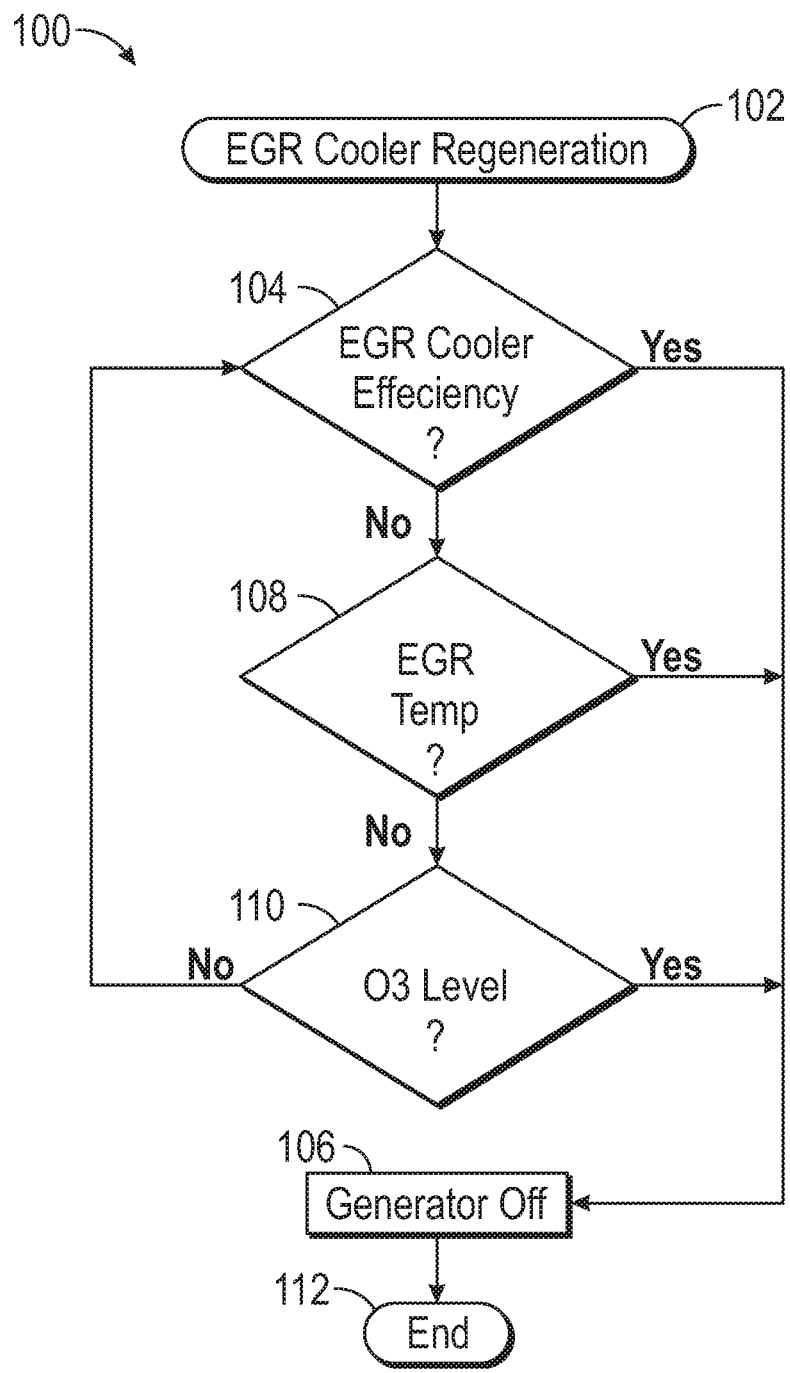
FIG. 3 is a flowchart of a method for facilitating the soot oxidation reaction in the EGR cooler.

With reference to FIGS. 2 and 3, the controller 48 is programmed to execute the method 100, which achieves the optimal ozone concentration to regenerate the EGR cooler 34. By employing this method 100, catalyst is deposited on the internal walls of the EGR cooler 34 to facilitate the soot oxidation reaction. As a result, the efficiency of the EGR cooler 34 is maximized. By employing this method 100, soot in the EGR cooler 34 can be oxidized at room temperature. Ozone is a much stronger oxidant than $NO_2$ and $NO_3$. The method 100 beings at step 102, in which the EGR cooler regeneration starts. To do so, the controller 48 turns on the plasma generator 46 to supply oxidizers, such as ozone, to the EGR cooler 34. Then, at step 104, the controller 48 determines the efficiency of the EGR cooler 34. To do so, the controller 48 receives input signals from received from the EGR inlet-temperature sensor 56, EGR outlet-temperature sensor 60, the coolant-inlet temperature sensor 62, and the coolant-outlet temperature sensor 64, and then determines the efficiency of the EGR cooler 34 based, at least in part, on the temperatures of the exhaust gases EG flowing into and out of the EGR cooler 34 and the temperatures of the coolant flowing into and out of the EGR cooler 34. In other words, the controller 48 is programmed to determine the efficiency of the EGR cooler 34. If the efficiency of the EGR cooler 34 is greater than a minimum efficiency threshold, then the controller 48 is programmed to turn off the plasma generator 46 at step 106 to stop the flow of oxidizers, such as ozone, into the EGR cooler 34. In other words, the controller 48 is programmed to determine that the efficiency of the EGR cooler 34 is greater than the minimum efficiency threshold at step 104, and, in response, the controller 48 turns off the plasma generator 46 at step 106. If the efficiency of the EGR cooler 34 is not greater than the minimum efficiency threshold, then the method 100 proceeds to step 108.

At step 108, the controller 48 determines the temperature of the exhaust gases EG flowing into the EGR cooler 34 based on the input signal from the EGR inlet-temperature sensor 56. Also, at step 108, if the controller 48 determines that the temperature of the exhaust gases EG flowing out of the EGR cooler 34 is falls within a predetermined EG temperature range, then the method 100 proceeds to step 106, and the controller 48 turns off the plasma generator 46.

To optimize the operation of the EGR cooler 34, the EGR cooler 34 should operates within the predetermined EGR temperature range. As a non-limiting example, the upper limit of the predetermined EGR temperature range may be two hundred degrees Celsius, and the lower limit of the predetermined EGR temperature range may be one hundred degrees Celsius. Again, at step 108, In response to determining that the temperature of the exhaust gases flowing into the EGR cooler 34 falls within the predetermined EGR temperature range, the controller 48 is programmed to turn off the plasma generator 46 to stop the flow of oxidizers, such as ozone, into the EGR cooler 34. If the temperature of the exhaust gases EG flowing into the EGR cooler 34 is falls within the predetermined EGR temperature range, the method 100 proceeds to step 110.

At step 110, the controller 48 determines if the ozone concentration of the exhaust gases flowing out of the EGR cooler is greater than a maximum ozone-concentration threshold based on an input signal from the EGR oxygen sensor 66. If the ozone concentration of the exhaust gases flowing out of the EGR cooler is greater than the maximum ozone-concentration threshold, then the controller 48 proceeds to step 106 and turns off the plasma generator 46. After step 106, the method 100 ends at step 112. If the ozone concentration of the exhaust gases flowing out of the EGR cooler is greater than the maximum ozone-concentration threshold, then the method 100 returns to step 104. By employing the method 100, the plasma generator 46 supplies the optimal ozone concentration to regenerate the EGR cooler 34. Also, by employing this method 100, soot oxidization reaction in the EGR cooler 34 is facilitated, thereby enchasing the efficiency of the EGER cooler 34.

Figure 4:
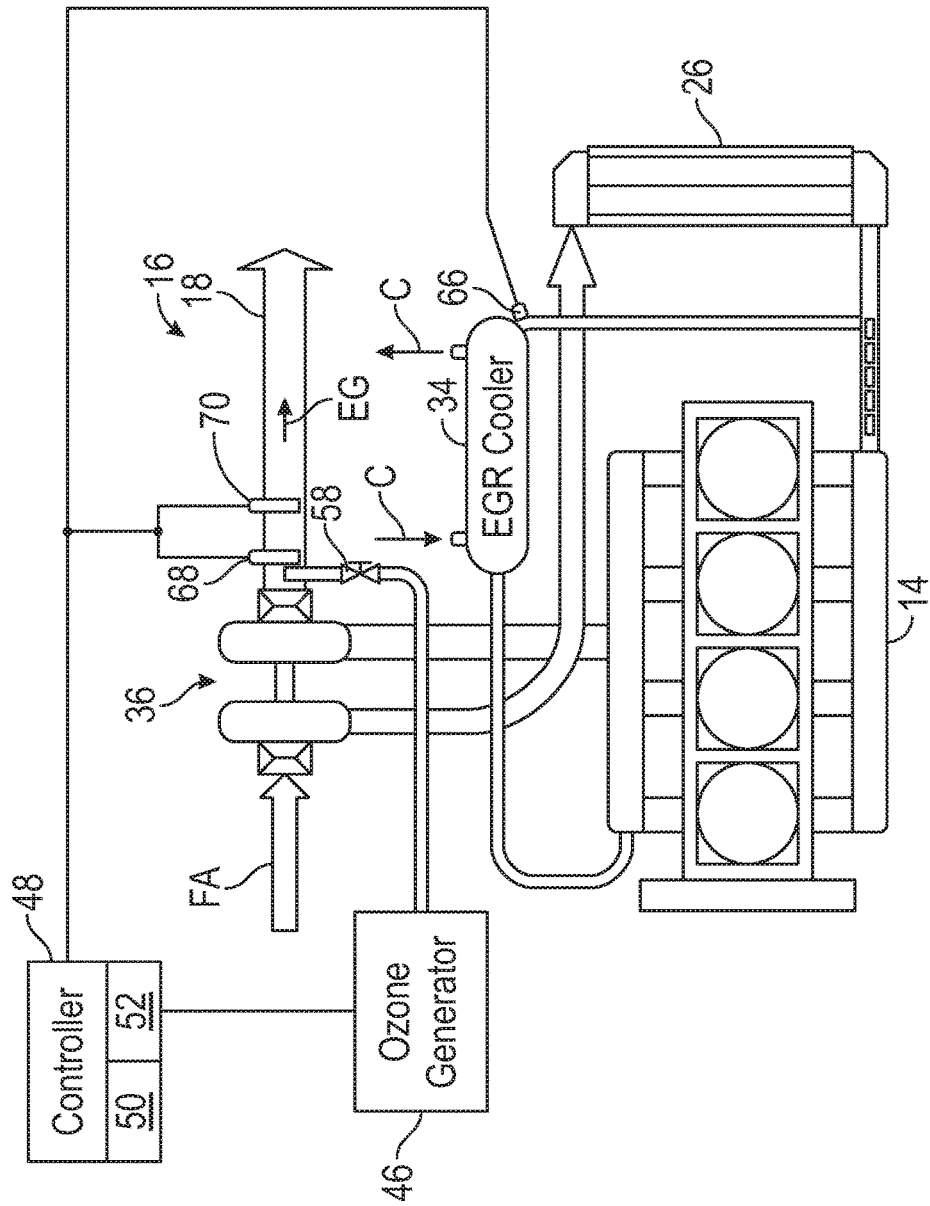
FIG. 4 is a schematic diagram of an engine assembly including an oxygen sensor and a plasma generator in fluid communication with an oxygen sensor.

With reference to FIG. 4, as discussed above, the plasma generator 46 may be in direct fluid communication with the main conduit 18 of the aftertreatment system 16. In this embodiment, the plasma generator 46 is physically separated from (but in fluid communication with) the main conduit 18. However, this embodiment may be combined with any of the other embodiments described above. The engine assembly 12 further includes an aftertreatment oxygen sensor 68 coupled to the controller 48. Accordingly, the controller 48 can receive input signals from the aftertreatment oxygen sensor 68. The aftertreatment oxygen sensor 68 can measure the oxygen concentration of the exhaust gases (EG) flowing through the main conduit 18 of the aftertreatment system 16. The aftertreatment oxygen sensor 68 is directly coupled to the main conduit 18 to determine the oxygen concentration in the exhaust gases (EG) flowing through the main conduit 18. The aftertreatment oxygen sensor 68 can generate a signal indicative of the oxygen concentration in the exhaust gases (EG) flowing through the main conduit 18 and communication such signal to the controller 48. In addition, the engine assembly 12 includes an aftertreatment temperature sensor 70 directly coupled to the main conduit 18. As such, the aftertreatment temperature sensor 70 can measure the temperature of the exhaust gases (EG) flowing through the main conduit 18, thereby indirectly measuring the temperature of the aftertreatment oxygen sensor 68.

Figure 5:
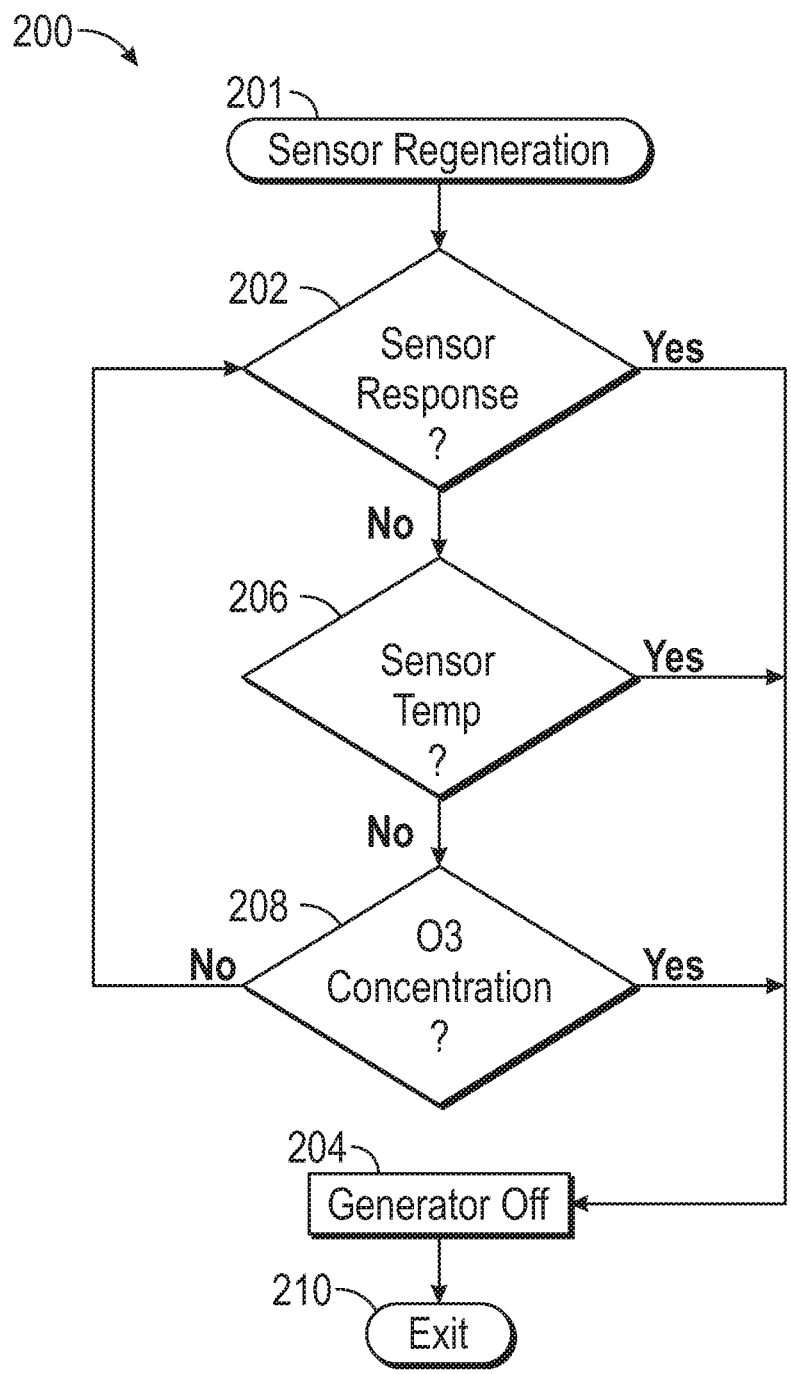
FIG. 5 a flowchart of a method for facilitating the soot oxidation reaction in the oxygen sensor.

With reference to FIGS. 4 and 5, the controller 48 is programmed to execute the method 200 for passively regenerating the aftertreatment oxygen sensor 68 covered with soot by, among other things, converting NO to $NO_2$. By employing this method 200, the response and accuracy of the aftertreatment oxygen sensor 68 is enhanced, and the fuel economy is enhanced. Also, the method 00 optimizes ozone concentration to maximize soot oxidation efficiency.

The method 200 begins at step 201, in which the sensor regeneration process starts. Then, the method proceeds to step 202, in which the controller 48 turns on the plasma generator 46 to supply ozone to the main conduit 18, thereby to regenerate the sensor. Then, the method 200 proceeds to step 204. At step 204, the controller 48 determines if the aftertreatment oxygen sensor 68 is operational. To do so, the controller 48 measure the response time of the aftertreatment oxygen sensor 68. If the sensor response time is greater than a maximum time threshold, then the controller 48 determines that the aftertreatment oxygen sensor 68 is not operation. Also, the controller 48 can determines that the aftertreatment oxygen sensor 68 is not operation if no signal is received from the aftertreatment oxygen sensor 68. Also, in response determining that the aftertreatment oxygen sensor 68 is operational, the method 200 proceeds to step 204, in which the controller 48 turns off the plasma generator 46. If the aftertreatment oxygen sensor 68 is not operational, then the method 200 proceeds to step 206. At step 206, the controller 48 determines the temperature of the aftertreatment oxygen sensor 68 based on the input signal received from aftertreatment temperature sensor 70. If the temperature of the aftertreatment oxygen sensor 68 is greater than a minimum sensor-temperature threshold, then the method 200 proceeds to step 208.

At step 208, the controller 48 determines if the ozone concentration of the exhaust gases flowing through the main conduit 18 is greater than a maximum ozone-concentration threshold based on an input signal from aftertreatment oxygen sensor 68. If the ozone concentration of the exhaust gases flowing through the main conduit 18 is greater than the maximum ozone-concentration threshold, then the method 200 proceeds to step 204 and turns off the plasma generator 46. After step 204, the method 100 ends at step 210. If the ozone concentration of the exhaust gases flowing through the main conduit 18 is greater than the maximum ozone-concentration threshold, then the method 100 returns to step 202.

Figure 6:
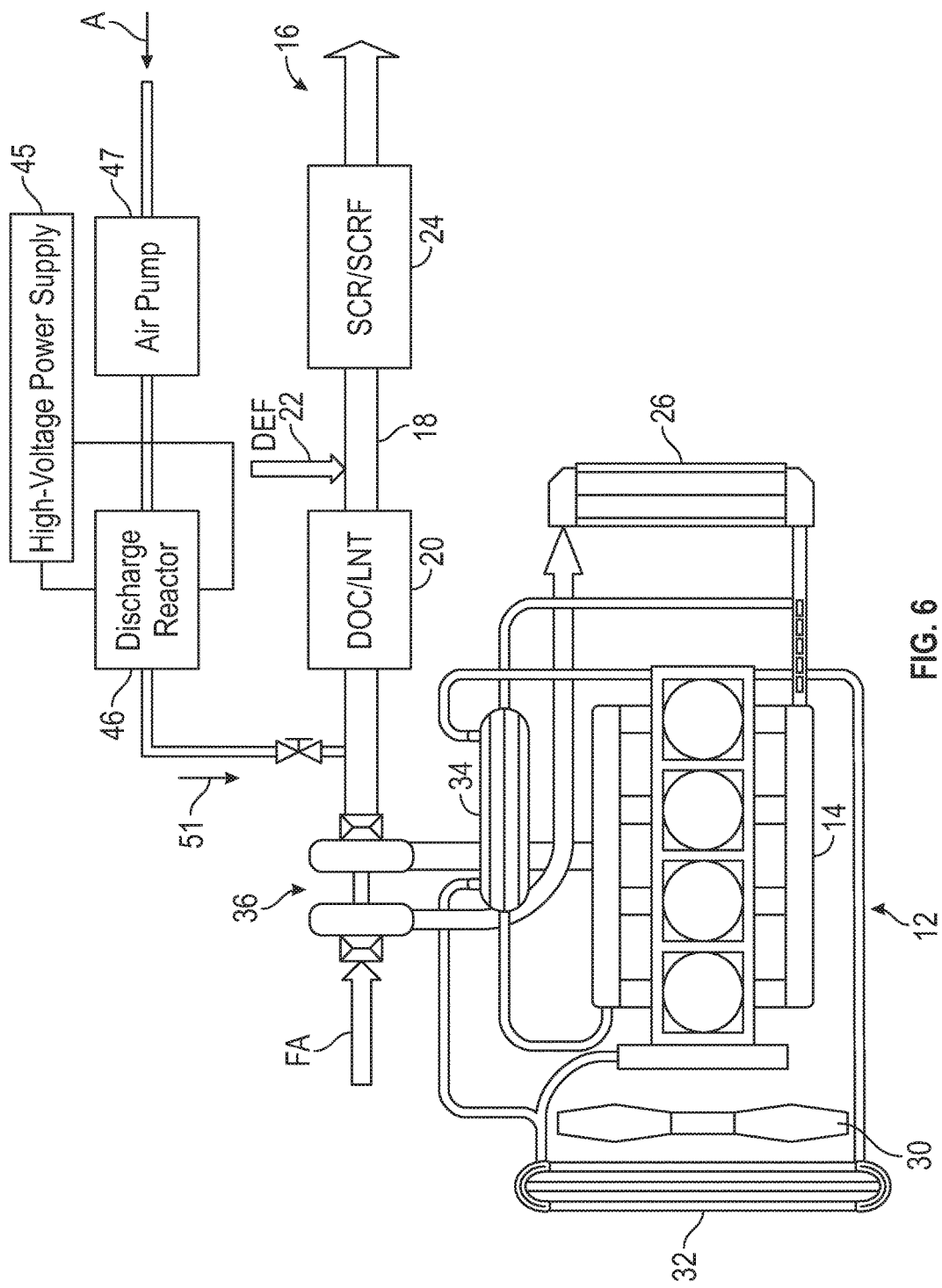
FIG. 6 is a schematic diagram of an engine assembly including a plasma generator in fluid communication with a main conduit of an aftertreatment system, wherein the plasma generator is in a side-stream location.

With reference to FIG. 6, the plasma generator 46 may be a in a side-stream location. In other words, the plasma generator 46 may be fluidly coupled in parallel with the main conduit 18 of the aftertreatment system 16. The plasma generator 46 may be referred to as a discharge reactor and is in fluid communication with an air pump 47. The air pump 47 draws air A towards the plasma generator 46. The plasma generator 46 then supplies oxidizers 51 directly into the main conduit 18 (downstream of the turbocharger 46 and upstream of the DOC 20 or TWC).

Figure 7:
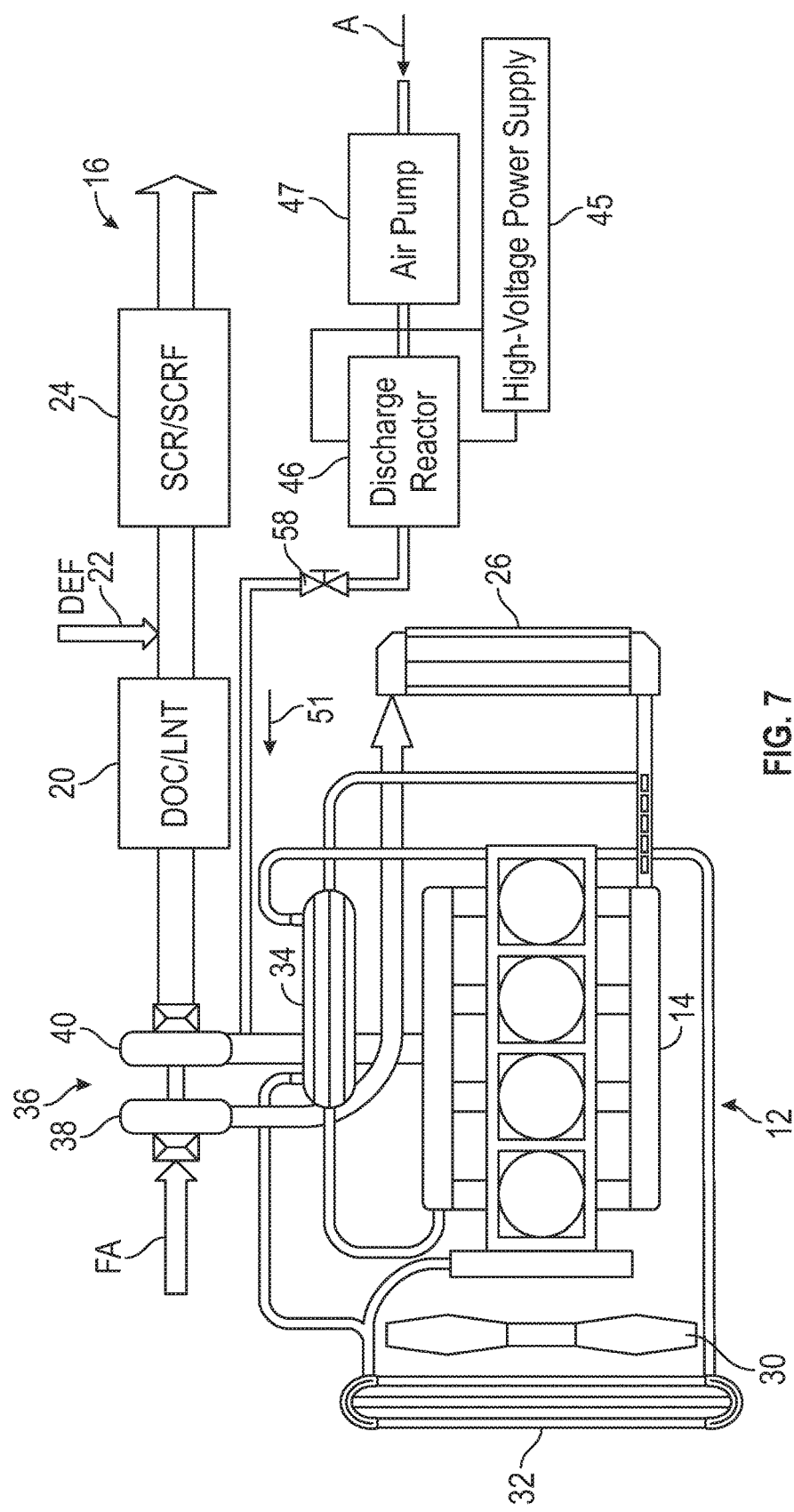
FIG. 7 is a schematic diagram of an engine assembly including a plasma generator in fluid communication with a turbocharger.

With reference to FIG. 7, the plasma generator 46 may be a in a pre-turbo location. In other words, the plasma generator 46 is upstream of the turbocharger 36. Specifically, the plasma generator 46 is upstream of the turbine 40.

Figure 8:
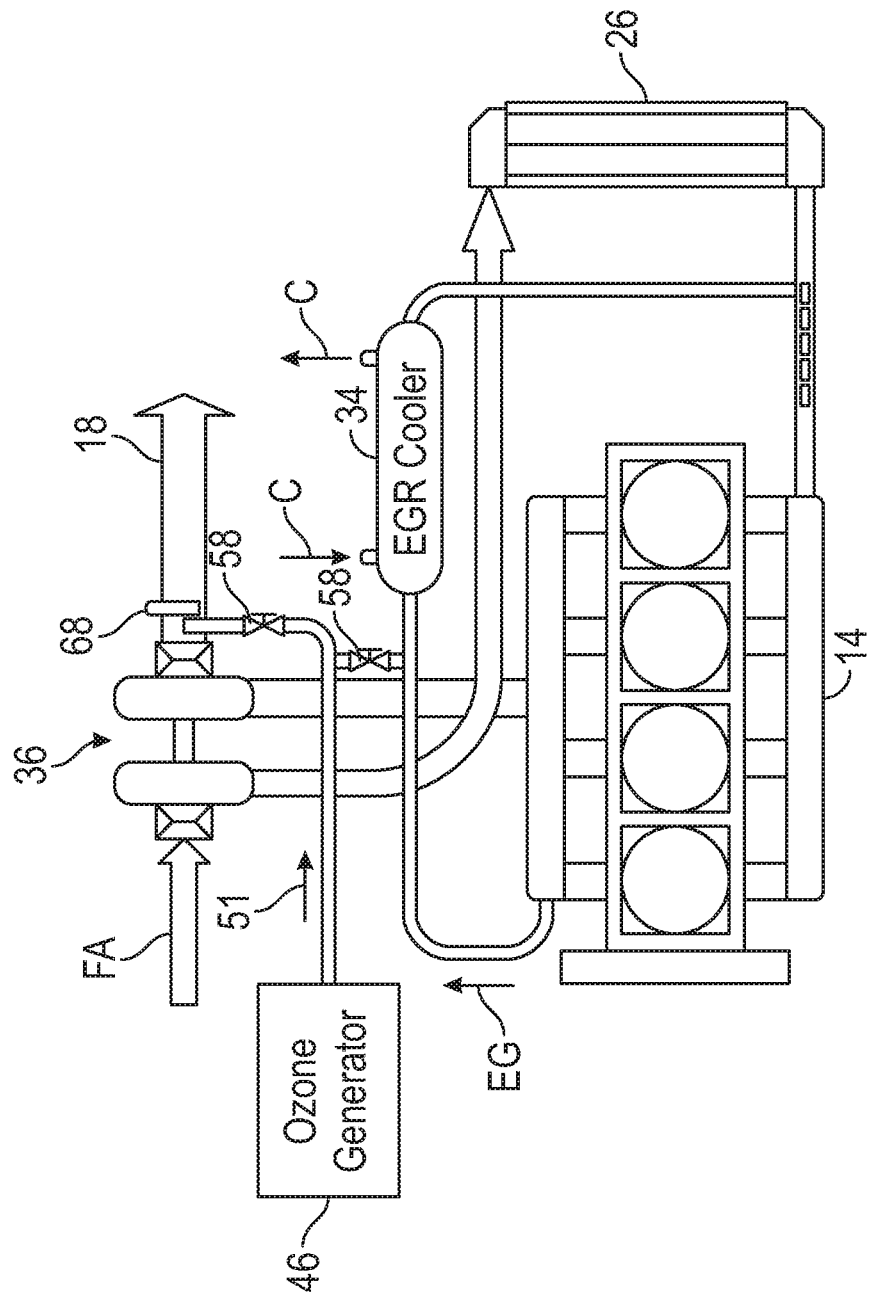
FIG. 8 is a schematic diagram of an engine assembly including a plasma generator in fluid communication with a main conduit and an EGR cooler.

With reference to FIG. 8, the plasma generator 46 is in fluid communication with both the EGR cooler 34 and the main conduit 18. Accordingly, in this embodiment, the oxidizers 51 can be used for sensor regeneration and EGR cooler regeneration.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An engine assembly, comprising:
   an internal combustion engine;
   an aftertreatment system coupled to the internal combustion engine, wherein the aftertreatment system includes:
      a catalyst coupled to the internal combustion engine such that the catalyst receives exhaust gases from the internal combustion engine;
      a plasma generator in fluid communication with the catalyst, wherein the plasma generator is upstream of the catalyst and downstream of the internal combustion engine, and the plasma generator is configured to generate oxidizers to at least partially oxidize hydrocarbons in the exhaust gases exiting the internal combustion engine;
   an exhaust gas recirculation (EGR) cooler in fluid communication with the internal combustion engine, wherein the plasma generator is in fluid communication with the EGR cooler, wherein the plasma generator is configured to supply the oxidizers to the EGR cooler to facilitate a soot oxidation reaction in the EGR cooler;
   a controller coupled to the plasma generator to allow the controller to control the plasma generator, wherein the controller is programmed to turn on the plasma generator; and
   wherein the controller is programmed to determine that an efficiency of the EGR cooler is greater than a minimum efficiency threshold, and the controller is programmed to turn off the plasma generator in response to determining that the efficiency of the EGR cooler is greater than the minimum efficiency threshold.

2. The engine assembly of claim 1, further comprising a turbocharger in fluid communication with the aftertreatment system, wherein the turbocharger is in fluid communication with the plasma generator.

3. The engine assembly of claim 2, wherein the turbocharger defines an ambient air inlet and an exhaust gas outlet, and the plasma generator is closer to the exhaust gas outlet than to the ambient air inlet.

4. The engine assembly of claim 1, wherein the controller is programmed to determine that a temperature of the exhaust gases flowing out the EGR cooler falls within a predetermined EGR temperature range, and the controller is programmed to turn off the plasma generator in response to determining that the temperature the exhaust gases flowing out of the EGR cooler falls within the predetermined EGR temperature range.

5. The engine assembly of claim 4, wherein the controller is programmed to determine that an ozone concentration of the exhaust gases flowing out of the EGR cooler is greater than a maximum ozone-concentration threshold, and the controller is programmed to turn off the plasma generator in response to determining that the ozone concentration of the exhaust gases flowing out of the EGR cooler is greater than the maximum ozone-concentration threshold.

6. The engine assembly of claim 1, wherein the aftertreatment system includes a main conduit and an aftertreatment oxygen sensor coupled to the main conduit such that the aftertreatment oxygen sensor is configured to determine an oxygen concentration in the exhaust gases flowing through the main conduit, and the aftertreatment oxygen sensor is configured to generate a signal indicative of the oxygen concentration in the exhaust gases flowing through the main conduit.

7. The engine assembly of claim 6, wherein the controller is in communication with the aftertreatment oxygen sensor.

8. An engine assembly, comprising:
   an internal combustion engine;
   an aftertreatment system coupled to the internal combustion engine, wherein the aftertreatment system includes:
      a catalyst coupled to the internal combustion engine such that the catalyst receives exhaust gases from the internal combustion engine;
      a plasma generator in fluid communication with the catalyst, wherein the plasma generator is upstream of the catalyst and downstream of the internal combustion engine, and the plasma generator is configured to generate oxidizers to at least partially oxidize hydrocarbons in the exhaust gases exiting the internal combustion engine;
   wherein the aftertreatment system includes a main conduit and an aftertreatment oxygen sensor coupled to the main conduit such that the aftertreatment oxygen sensor is configured to determine an oxygen concentration in the exhaust gases flowing through the main conduit, and the aftertreatment oxygen sensor is configured to generate a signal indicative of the oxygen concentration in the exhaust gases flowing through the main conduit;
   a controller coupled to the plasma generator to allow the controller to control the plasma generator, wherein the controller is programmed to turn on the plasma generator, and the controller is in communication with the aftertreatment oxygen sensor; and
   wherein the controller is configured to determine that the aftertreatment oxygen sensor is operational, and the controller is configured to turn off the plasma generator in response to determining that the aftertreatment oxygen sensor is operational.

9. The engine assembly of claim 8, wherein the controller is configured to determine that a temperature of the aftertreatment oxygen sensor falls outside a predetermined sensor-temperature range, and the controller is programmed to turn off the plasma generator in response to determining that the temperature of the aftertreatment oxygen sensor falls outside the predetermined sensor-temperature range.

10. The engine assembly of claim 9, wherein the controller is configured to determine that the oxygen concentration of the exhaust gases flowing through the main conduit is greater than an oxygen-concentration threshold, and the controller is programmed to turn off the plasma generator in response to determining that the oxygen concentration of the exhaust gases flowing through the main conduit is greater than the oxygen-concentration threshold.

11. A vehicle, comprising:
   a diesel internal combustion engine;
   an aftertreatment system coupled to the diesel internal combustion engine, wherein the aftertreatment system includes:
      a main conduit coupled to the diesel internal combustion engine, wherein the main conduit is configured to receive exhaust gases from the diesel internal combustion engine;
      a diesel oxidation catalyst coupled to the main conduit;
      a plasma generator in fluid communication with the main conduit, wherein the plasma generator is upstream of the diesel oxidation catalyst and downstream of the diesel internal combustion engine, and the plasma generator is configured to generate oxidizers to at least partially oxidize hydrocarbons in the exhaust gases exiting the diesel internal combustion engine; and a turbocharger in fluid communication with the aftertreatment system, wherein the turbocharger is in fluid communication with the plasma generator; wherein the turbocharger defines a turbocharger inlet and a turbocharger outlet, and the plasma generator is closer to the turbocharger outlet than to the turbocharger inlet;

an exhaust gas recirculation (EGR) cooler in fluid communication with the diesel internal combustion engine, wherein the plasma generator is in fluid communication with the EGR cooler, wherein the plasma generator is configured to supply the oxidizers to the EGR cooler to facilitate a soot oxidation reaction in the EGR cooler;

a controller coupled to the plasma generator to allow the controller to control the plasma generator, wherein the controller is programmed to turn on the plasma generator, the controller is programmed to determine that an efficiency of the EGR cooler is greater than a minimum efficiency threshold, and the controller is programmed to turn off the plasma generator in response to determining that the efficiency of the EGR cooler is greater than the minimum efficiency threshold.

12. The vehicle of claim 11, wherein the controller is programmed to determine that a temperature of the exhaust gases flowing into the EGR cooler is greater than a maximum EGR-temperature threshold, and the controller is programmed to turn off the plasma generator in response to determining that the temperature of the temperature of the exhaust gases flowing into the EGR cooler is greater than the maximum EGR-temperature threshold.

* * * * *